United States Patent [19]
Bennett et al.

[11] 3,897,338

[45] *July 29, 1975

[54] AIR CANE FILTER DEVICE

[75] Inventors: John P. Bennett, Portola Valley; George D. Bliss, Palo Alto, both of Calif.

[73] Assignee: Syntex Inc., Palo Alto, Calif.

[ * ] Notice: The portion of the term of this patent subsequent to Oct. 15, 1991, has been disclaimed.

[22] Filed: Dec. 11, 1973

[21] Appl. No.: 423,720

[52] U.S. Cl. ............................. 210/169; 210/274
[51] Int. Cl.² ..................................... E04H 3/20
[58] Field of Search ............. 210/169, 17, 274; 261/121 M

[56] References Cited
UNITED STATES PATENTS

| | | | |
|---|---|---|---|
| 2,730,496 | 1/1956 | Zavod | 210/169 |
| 3,487,935 | 1/1970 | Lovitz | 210/169 |
| 3,785,494 | 1/1974 | Sama | 210/169 |
| 3,841,999 | 10/1974 | Bennett et al. | 210/169 X |

*Primary Examiner*—Frank A. Spear, Jr.
*Assistant Examiner*—Ferris H. Lander
*Attorney, Agent, or Firm*—Tom M. Moran; Larry S. Squires

[57] ABSTRACT

An aquarium filter and aerator adapted to be introduced into an aquarium containing a body of liquid and a gravel bed comprises a rigid elongated tubular member defining a filtration and aeration chamber, closed at its lower end and open at its upper end, and adapted to be inserted into and through all or a portion of the gravel bed, and having foraminous structure at its lower portion permitting flow of liquid into said member from the aquarium. A foraminous air dispersing means is supported in the interior of the elongated tubular member at a point slightly above the foraminous portion. An air inlet tube extends downwardly through the interior of the upper portion of the elongated tubular member therewith to supply air via the air dispersing means to the interior of the tubular member at a point slightly above the foraminous portion thereof. The air stream acts as an air lift, drawing aquarium liquid into the device and aerating it by means of fine air bubbles provided by the action of the air distribution means, permitting confined aeration to take place. Purified liquid is discharged from the upper end of the elongated tubular member back into the aquarium.

11 Claims, 6 Drawing Figures

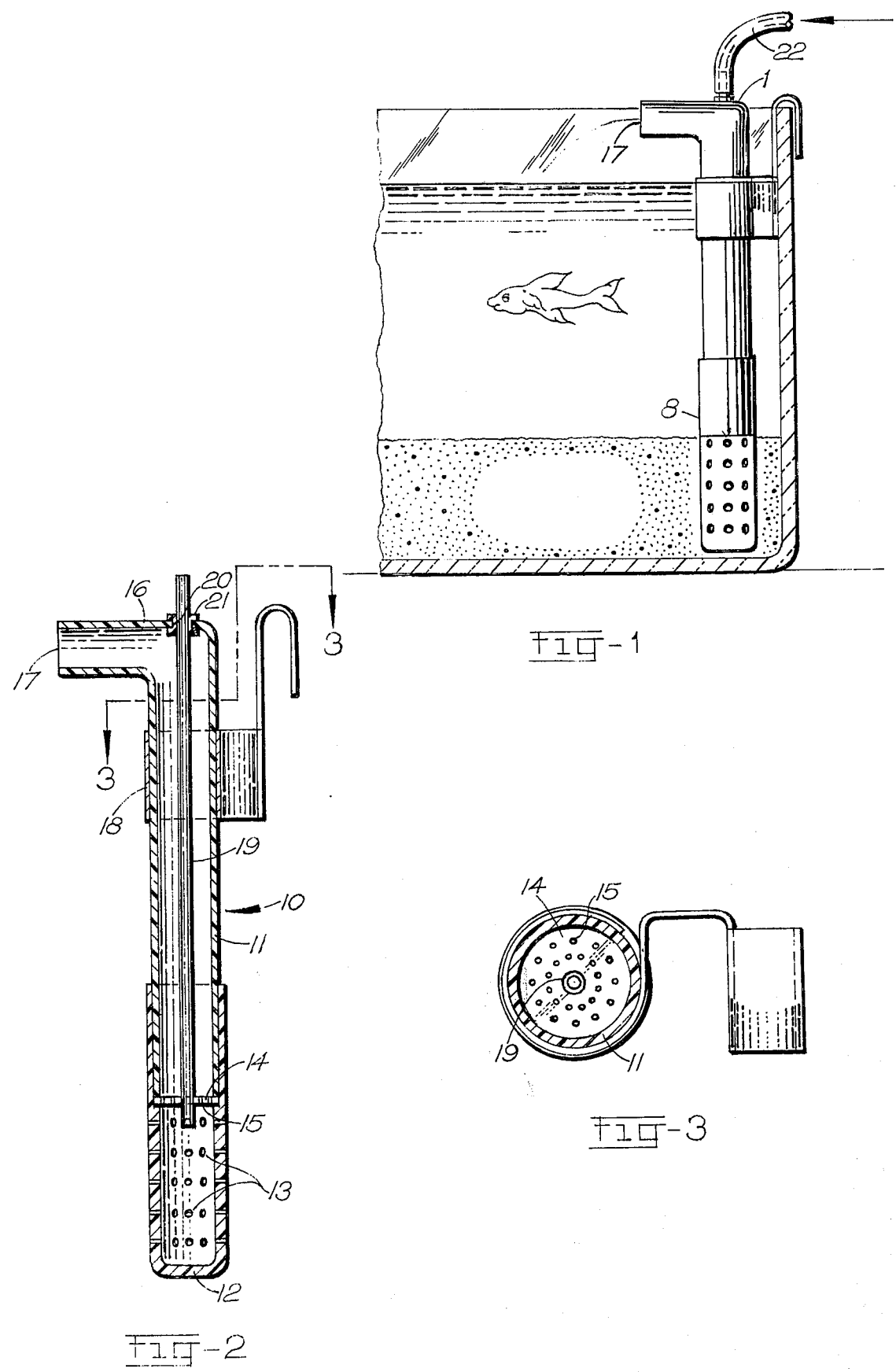

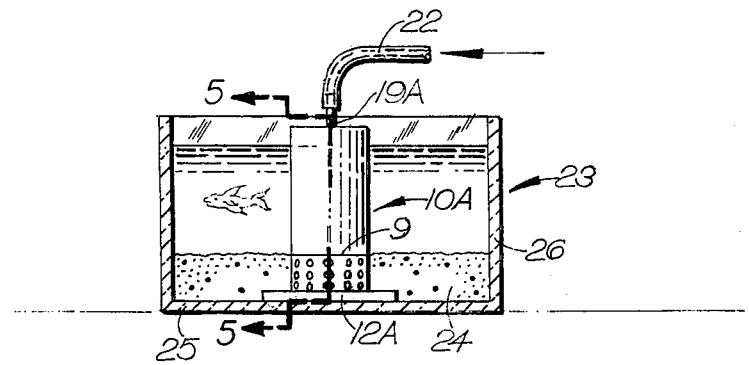
Fig-4
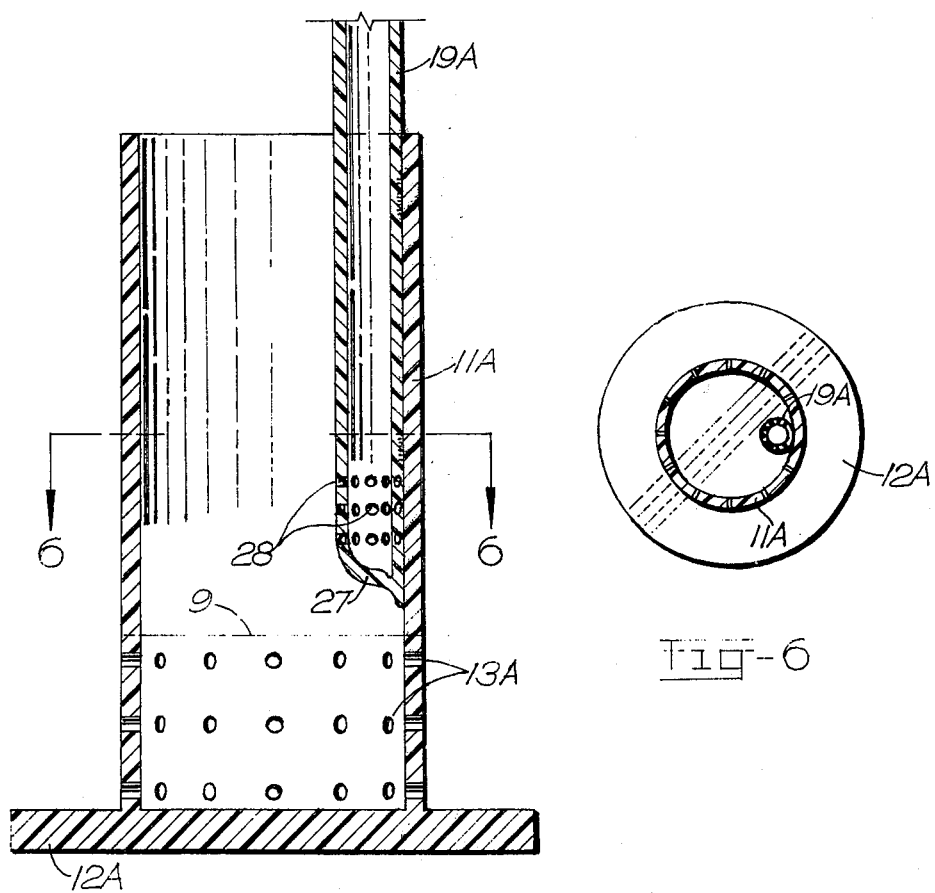
Fig-5
Fig-6

AIR CANE FILTER DEVICE

BACKGROUND OF THE INVENTION

1. The Invention

The present invention relates to a novel device for the purification and aeration of water employed in aquaria or other similar vessels used for raising and/or maintaining fish, crustacea, and the like, and to the use thereof in combination with the aquaria.

The device of the invention is known as a filter air cane, this term denoting a small or medium sized portable device which is readily inserted into any desired portion of small aquaria or fish bowls, for the purpose of purifying, aerating, and recirculating the aquarian liquid.

2. The Prior Art

The relatively small size of aquaria as compared with the natural environment of fish and other marine life, causes the aquarium water to become contaminated with organic waste, excess food, and various organisms such as algae in a comparatively short time. These contaminants must be removed frequently to avoid accumulated pollution which is harmful to the fish or other marine life, to remove odors, and to offset cloudiness formation which adversely affects the clarity and aesthetic appeal of the aquarium contents.

Filter devices to aid in clarifying aquarium waters have been proposed in the prior art, but these have usually been permanently installed as a part of the total aquarium assembly, and have been located close to the reservoir wall. A device of this character is that disclosed in U.S. Pat. No. 2,730,496. Another class of aquarium filters in the prior art has been those supported exteriorly of the aquarium vessel, and known as outside filters, for example, the device disclosed in U.S. Pat. No. 2,737,490. Still others have relied on elaborate outside water circulation systems, as shown in U.S. Pat. No. 3,135,238. A portable type of filter aerator device designed to be immersed in the aquarium, requiring a conical lower chamber and utilizing a venturi suction action is disclosed in U.S. Pat. No. 2,744,065.

The prior art filter devices and systems have lacked flexibility, and have been comparatively complicated to operate and maintain. What has been lacking has been a simple, portable filter and aerator that could be readily assembled and disassembled, and inserted into the gravel bed of aquaria at any desired position, but easily withdrawn for use elsewhere, or for cleaning. This need has now been supplied by the air cane type filter and aerator of the present invention.

SUMMARY OF THE INVENTION

The air cane filter and aerator device of the invention comprises, in combination, a rigid elongated tubular member open at its upper end and closed at its lower end, defining a filtration and aeration chamber, adapted to be inserted into and through all or a portion of a bed of gravel or other aggregate at the bottom of an aquaculture pool. The elongated tubular member is provided at its lower portion with a plurality of small openings, preferably arranged in parallel rows, constituting a foraminous structure, to permit flow of liquid from the aquarium into the interior of the tubular member. Positioned at a small distance above the upper level of said openings is an air dispersing means which acts as an air diffusion or dispersal means, and can be supported within the tube. Positioned within and communicating with the elongated tubular member and approximately parallel, and one embodiment approximately coaxial, therewith is an elongated tubular member of smaller diameter which functions as an air inlet or supply means for the air distribution means and an air lift. The lower end of the air supply tube extends through the center opening of the foraminous disc for a distance such that its lower end is slightly above the upper level of the small openings in the tubular member. The air inlet tube is adjustably movable longitudinally. The upper end of the elongated foraminous tubular member is provided with a curved upper end, or elbow, permitting the stream of water rising therethrough to be discharged in a direction parallel to the upper surface of the water in the pool. The upper end of the air tube member extends through this elbow portion through an opening therein provided with sealing means.

BRIEF DESCRIPTION OF THE DRAWING

The invention will be further described herein below with respect to the drawing wherein like reference numerals refer to the same or like parts, but the invention is not limited thereto, as various other embodiments and modifications can be made without departing from the essence and scope of the invention. In the drawings:

FIG. 1 is a vertical section through an aquarium showing one embodiment of the device of the invention in position for operation;

FIG. 2 is a vertical section taken through the air cane filter shown in FIG. 1 showing the relationship of the several parts;

FIG. 3 is an enlarged horizontal section taken along the line 3—3 of FIG. 2;

FIG. 4 is a verticle section through an aquarium illustrating the operation of a simplified embodiment of the device of the invention;

FIG. 5 is a verticle section taken through the device shown in FIG. 4; and

FIG. 6 is a horizontal section taken along line 6—6 of FIG. 5.

DETAILED DESCRIPTION OF THE INVENTION

Referring to FIGS. 2 and 3, the device of the present invention, shown generally at 10, comprises elongated tubular member 11, which can be constructed of any suitable material, such as noncorrodible metal, for example, aluminum or stainless steel, in light gages, or preferably of a transparent nontoxic plastic material, such as polyethylene, polypropylene or polyvinyl chloride. The tubular member can be of any desired cross-sectional configuration, but is preferably cylindrical. It has an internal diameter sufficient to accommodate the internal air tube, for example, from about ½ inch to 1 inch, and has a wall thickness adequate to provide the necessary rigidity for thrusting through the gravel bed on the bottom of the aquarium or other vessel. The bottom of the tubular member is closed by member 12, which can be integral therewith, or which can be applied as a slip fit cap, screw cap or snap-on cap, in accordance with conventional designs.

Tubular member 11, or as shown in FIG. 2, tubular closure member 12, is provided in its lower portion with a foraminous structure comprising a plurality of perforations 13 distributed around its circumference. For convenience, the external wall of the device can be etched or marked with line 8 corresponding approximately to a preferred minimal depth of the gravel bed into which it is to be inserted; i.e. indicating a gravel bed depth such that holes 13 are below the level of the gravel bed. These perforations should be of sufficient diameter to permit free movement of aquarium liquid therethrough, but smaller than the mean particle size of the gravel or aggregate pieces, so as to prevent or minimize passage of the latter into the filter and aerator. Typically, the opening size will range about from ⅛ inch to about ¼ inch.

In the embodiment shown in FIGS. 1–3, the air dispersing means is a foraminous air dispersal disc or plate 14 of the same cross-sectional configuration as the tubular member 10 positioned within the latter at a level slightly above the uppermost row of perforations, and has a diameter such as to provide a fairly close fit to prevent substantial movement of water past its perimeter, but which still permits ready removability of the disc 14 for cleaning or replacement. As shown in FIG. 2, the disc 14 can rest on and be supported by the upper wall of the shoulder, or recess, in the internal wall of the lower tube closure member 12. Alternatively, or in addition to the shoulder, disc 14 can be affixed to the internal wall of tube 14 and/or air supply tube 19. Disc 14 can be either permanently or removably fixed. Also, in the embodiments wherein passages 13 are located in the lower portion of tube 11 and wherein tube 11 is closed by a simple cat means, the disc means 14 can be conveniently supported by the use of indents or protrusions in the internal wall of tube 11 or by the use of indents or protrusions in the external wall of air supply tube 19. The disc is provided with small perforations which serve to subdivide the air stream passing through it. However, other air dispersing means could also be used, for example, in place of the disc embodiment, tube 19 can be closed at its lower end and provided with a plurality of passages through the lower wall portion located at a position near but above perforations 13, in the same manner as the embodiment shown in FIGS. 4–6.

The upper end of tubular member 11 terminates in a curved portion or elbow 16, the outer end of which is preferably at approximately 90° to the axis of the tubular member, and which has opening 17 permitting discharge of water and air from the device. This discharge means 13 are located at a point above the water level in the aquarium, and returns the aerated water to the aquarium or vessel in a direction parallel to the upper surface, thereby minimizing agitation within the body of aquarium water itself. Alternatively, the curved portion or elbow 16 can be omitted and the water returned over the open top wall of tube 11 as in the embodiment shown in FIGS. 4–6.

If desired, tubular member 11 can be provided with a friction slip-fit sleeve clip 18 to provide convenient support and vertical positioning of the device in the aquarium. In the embodiment shown in FIG. 2, tube means 11 is engaged with closure tube means 12 in a telescoping sleeve fit to permit vertical positioning and adjustment of the discharge opening 17 with respect to the water level, or depth, in the aquarium.

An air supply tube 19 is removably and adjustably positioned in the interior of tubular member 11, extending coaxially therewith to a point such that its lower open end is a short distance above the top row of perforations 13. The air tube 19 passes through the center of disc 14. The upper end of air tube 19 passes through an opening in upper part of the elbow portion 16 of tubular member 11. This opening 20 may be provided with a seal 21, such as a ring of elastomeric material, for example, synthetic rubber or polyethylene, which permits longitudinal movement of tube 19, while at the same time preventing water and air from escaping as they pass through the elbow portion 16. The upper end of air tube 19 is connected to an air supply (not shown) by flexible tubing 22, or other suitable means.

As shown in FIG. 1, the device of the invention is operated by thrusting the assembled filter-aerator through the bed of aggregate 24 located at the bottom 25 of an aquarium tank 23, at any desired location, although usually this will be at a point near the wall 26. If desired, the device can be provided with hanger or clip means 18 for removable attachment to the aquarium wall, while in use. Alternatively, the closure cap can be provided with a support base or flange similar to that shown with respect to the embodiment of FIGS. 4–6. It will be apparent that the component parts of the device can be readily assembled or disassembled. When assembled, the device constitutes a unitary structure which can be readily manipulated and which is highly effective in maintaining or restoring the biological quality of the aquarium liquid. Indications of toxic substance buildup are rapidly eliminated, and the freshness of the water is restored within a matter of a few hours or even minutes. In contrast thereto, the conventional so-called air stone devices are capable of aerating only the water immediately above the gravel bed. Aquarium water is drawn through the established gravel bed of the aquarium, thereby utilizing the bed as a filter bed and further facilitating a degree of aerobic degradation of wastes due to the entrained air retained by the circulating water. The water passes through the openings 13 into the tubular member 11, and is admixed with a stream of air supplied through air tube 19. The mixture of water and air is forced upward through the small openings 15 in disc 14 thereby breaking up the large supplied air bubbles into fine diameter air bubbles which present a large surface and thus achieve effective aeration and more constant, or smoother, water flow. The air tube thus acts as an air lift, forcing the water-air mixture upward through the tube 11 and causing its discharge and return to the aquarium through opening 17.

The device shown in FIGS. 4–6 is a simplified and inexpensive embodiment of the invention which is particularly adapted for use in small capacity aquariums, for example, on the order of about from ½ to 15 gal. and typically ½ to 5 gal. aquariums. Referring to FIGS. 5 and 6, the filter aerator device comprises an elongated tubular member 11A which can be constructed of any suitable material as in the case of the embodiment shown in FIGS. 1–3, and similarly can be of any desired cross-sectional configuration but preferably is cylindrical. Typically, tubular member 11A will have an internal diameter of about from ⅜ to one inch, preferably about from ½ to one inch. The bottom of tubular member 11A is closed by member 12A which can be integral therewith or which can be affixed as a removable screw cap or snap cap of conventional design. In the preferred embodiment, shown in FIG. 5, closing member 12A has a diameter larger than tubular member 11A and also serves a base or stand for the filter device in the aquarium. Base 12A can, of course, also have any desired cross-sectional configuration and can have the same configuration as tubular member 11A or different configurations. The lower portion of tubular member 11A is provided with a number of perforations or passages 13A, preferably distributed around the entire circumference of tubular member 11A. Passages 13A serve to permit the entry of water from the aquarium into the interior or tubular member 11A and at the same time restrict passage of gravel aggregate from the aquarium bed into the interior or tubular member 11A. Typically, passages 13A will have an opening size or diameter in the range of about from 0.050 to 0.125 inches. The upper end of tubular member 11A is open in order to permit the passage of water from the interior of tubular member 11A back to the aquarium over the top of tubular wall 11A.

Air supply tube 19A extends into the interior of tubular member 11A and in the embodiment, shown in FIG. 5, is sealed or closed at its lower end 27 and provided with a plurality of small passages or perforations 28 generally distributed throughout the circumference of its lower portion. Passages 28 serve as an air dispersing means and supply dispersed air to the interior of tubular member 11A. Air tube 19A is positioned in tubular member 11A such that the perforations or passages 28 are above passages 13A in order to prevent air supplied via passages 28 from escaping through the passages 13A. In the embodiment shown in FIGS. 5 and 6, air tube 19A is permanently or adjustably fixed to the interior wall of tubular member 11A. Where a conventional plastic material, for example, polyethylene or polypropylene, has been used as the fabrication material, air supply tube 19A can be conveniently permanently affixed to tubular member 11A via simple gluing or cementing. Typically, conventional tubing having an outside diameter of 3/16 inch is used for air supply tube 19A since conventional aquarium air pumps are generally designed for this size air lines. Typically, passages 28 will have a diameter of about from 0.010 to 0.025 inches but the diameter and number of passages can vary with the diameter of the air supply tube and tubular member 11A.

Referring briefly to FIG. 4, the device 10A is conveniently positioned in the aquarium as shown in FIG. 4, with base 12A resting on bottom aquarium wall 25. Typically, the support provided by wall 12A, in combination with the weight of the gravel is sufficient to support the device without any other supporting or clamping means. The level of the gravel bed in the aquarium should be such that all of the perforations 13A are below the level of the gravel bed. Save for this requirement, the gravel bed can extend to any reasonable level. For convenience, a suitable gravel level can be indicated by etched line 9 on the exterior wall of tube 11A. In operation, air supplied to the interior of tubular member 11A, via passages 28, acts as an air lift causing water from the aquarium to be drawn through the gravel bed and into the interior of tubular member 11A via passages 13A. This water is then drawn upwardly through the interior of tubular member 11A via the air lift action of the air supplied via passages 28, and is aerated and discharged back to the aquarium over the open top of tubular member 11A. This embodiment is particularly advantageous to the small aquarium user in that the device can be manufactured of inexpensive material and supplied at a cost similar to that normally charged for convention aerators or aeration stones, thus provided both filtration and aeration at about the same cost as previously required for aeration alone.

Although the invention has been primarily described with respect to relatively small or display aquariums, it should be appreciated that one or more of the devices, of the invention, can be used in any aquaculture pool having a gravel bed and can be suitably enlarged or scaled up for use in large aquariums, tanks, or ponds such as, for example, used by commercial fisheries or hatcheries.

Obviously many modifications and variations of the invention, described herein above and below, can be made without departing from the essence and scope thereof.

What is claimed is:

1. A filtration and aeration device adapted to be positioned to an aquarium containing a body of liquid and a gravel bed, comprising in combination:

a. an elongated tubular member which is (i) closed at its lower end with a substantially planar wall substantially perpendicular to said elongated tubular member and of larger diameter than said tubular member thereby providing a base supporting means for said apparatus and (ii) open at its upper end thereby defining a chamber, said lower end adapted to be inserted into or through all or a portion of said gravel bed, said elongated tubular member being provided at its lower portion with foraminous structure comprising a plurality of passages for supplying water from the aquarium into the interior of said tubular member while restricting the flow of gravel into said interior;

b. air dispersion means for supplying dispersed air to the interior of said elongated tubular member at a point slightly above the uppermost level of said passages;

c. an air inlet tube means positioned in the interior of said elongated tubular member and entering said interior at the upper end of said elongated tubular member, for supplying air to said air dispersing means, whereby liquid is drawn from the aquarium through said gravel bed and through said passages into the interior of said elongated tubular member and aerated, and air lifted, through the interior of said elongated tubular member and discharged via said open end.

2. The apparatus of claim 1 wherein said air dispersal means comprises a foraminous disc supported in the interior of said elongated tubular member at a point slightly above the uppermost level of said passages and transversely to the axis of the tubular member, said disc being provided with a central opening of approximately the same diameter as said air inlet tube means and wherein said air inlet tube means extends through said central opening in approximately close fit therewith for a distance such that the lower end of said air inlet tube is located slightly above the upper level of said passage openings.

3. The apparatus of claim 2 in which the upper end of said elongated tubular member is curved to permit discharge of liquid and air in a direction parallel to the upper surface of said body of liquid, and is provided with an opening coaxial with the axis of said elongated tubular member through which said air inlet tube extends.

4. The apparatus of claim 2 in which said elongated tubular member includes interior supporting means for said foraminous disc.

5. The apparatus of claim 2 in which said air inlet tube passes through said opening in the upper end of the elongated tubular member.

6. The apparatus of claim 3 in which said opening in the upper end of the elongated member is provided with sealing means.

7. The apparatus of claim 2 wherein said apparatus includes means for vertically movably positioning said air inlet tube in said tubular member.

8. The apparatus of claim 7 in which said elongated tubular member includes means permitting telescoping or extension of the length of said member.

9. The apparatus of claim 1 wherein said air inlet tube enters the interior of said elongated tubular member through the open upper end of said elongated tubular member.

10. The apparatus of claim 1 wherein said air dispersal means comprises plurality of passages in the lower portion of said air inlet tubes for supplying air, in a dispersed condition, from said air inlet tube to said interior and wherein the lower end of said air inlet tube is closed.

11. The apparatus of claim 10 wherein said air inlet tube enters the interior of said elongated tubular member through the open upper end of said elongated tubular member.

* * * * *